United States Patent [19]
Bennett et al.

[11] Patent Number: 5,808,440
[45] Date of Patent: Sep. 15, 1998

[54] HYBRID COMMUNICATION METHOD AND APPARATUS FOR A THREE-PHASE BRUSHLESS DC MOTOR

[75] Inventors: George J. Bennett, Murrieta; Raffi Codilian, San Dimas, both of Calif.

[73] Assignee: Western Digital Corporation, Irvine, Calif.

[21] Appl. No.: 753,232

[22] Filed: Nov. 22, 1996

[51] Int. Cl.⁶ ........................................... H02P 1/26
[52] U.S. Cl. ........................ 318/778; 318/139; 318/254; 318/439
[58] Field of Search ................... 363/41; 318/139, 318/254, 439, 778

[56] References Cited

U.S. PATENT DOCUMENTS

| | | |
|---|---|---|
| 3,449,741 | 6/1969 | Egerton, Jr. . |
| 4,063,236 | 12/1977 | Amemiya et al. ................. 340/347 |
| 4,375,636 | 3/1983 | Stack et al. ........................ 340/347 |
| 4,847,743 | 7/1989 | Kamiyama .......................... 363/41 |
| 5,172,115 | 12/1992 | Kerth et al. ....................... 341/118 |
| 5,223,771 | 6/1993 | Chari ................................. 318/254 |
| 5,229,772 | 7/1993 | Hanlon .............................. 341/172 |
| 5,444,582 | 8/1995 | Suzuki ............................. 360/78.09 |
| 5,444,583 | 8/1995 | Erhlich et al. .................. 360/78.09 |
| 5,446,371 | 8/1995 | Eccleston et al. ................ 324/121 R |
| 5,471,353 | 11/1995 | Codilian et al. ................. 360/73.03 |
| 5,616,993 | 4/1997 | Lu et al. ............................. 318/254 |

OTHER PUBLICATIONS

Raffi Codilian and Don Stupeck, . "A Multi Mode Spindle Within a Disk Drive System," *Incremental Motion Control Systems Symposium* (IMCSS).

Raffi Codilian and Don Stupeck, ."An Optimization Method of Spindle Motor and Driver Selection Within a Disk Drive System," *Incremental Motion Control Systems Symposium* (IMCSS).

*Primary Examiner*—William M. Shoop, Jr.
*Assistant Examiner*—Kim Lockett
*Attorney, Agent, or Firm*—Leo J. Young, Esq.; Milad G. Shara, Esq.

[57] ABSTRACT

Commutation is the process of driving current through the windings to produce a rotating magnetic field that the rotor attempts to catch. Typically, four to six commutation cycles occur for each rotation of the rotor of the motor. Unlike traditional commutation methods where only six phases are commutated during one commutation cycle, the hybrid commutation cycle includes 12 phases. The particular method for commutation switches between current driving modes where one driving mode drives current through all three windings and an other driving mode drives current through less than all three windings of the motor. More particularly, in the second driving mode current is driven through two windings of the motor. During a commutation cycle, these driving modes are alternated.

2 Claims, 11 Drawing Sheets

| PHASE | CURRENT DIRECTIONS | TERMINAL | | |
|---|---|---|---|---|
| | | 300 | 302 | 304 |
| AB | a+b | H | L | L* |
| | | 406=ON | 412=ON | 418=ON |
| BC | b+c | H | H* | L |
| | | 406=ON | 410=ON | 418=ON |
| CD | c+d | L* | H | L |
| | | 408=ON | 410=ON | 418=ON |
| DE | d+e | L | H | H* |
| | | 408=ON | 410=ON | 420=ON |
| EF | e+f | L | L* | H |
| | | 408=ON | 412=ON | 420=ON |
| FA | f+a | H* | L | H |
| | | 406=ON | 412=ON | 420=ON |

\* INDICATES CURRENT SWITCH

FIG. 6

| PHASE | CURRENT DIRECTIONS | TERMINAL | | |
|---|---|---|---|---|
| | | 300 | 302 | 304 |
| A | a | H<br>406=ON | L<br>412=ON | X |
| B | b | H<br>406=ON | X | L<br>418=ON |
| C | c | X | H<br>410=ON | L<br>418=ON |
| D | d | L<br>408=ON | H<br>410=ON | X |
| E | e | L<br>408=ON | X | H<br>420=ON |
| F | f | X | L<br>412=ON | H<br>420=ON |

FIG. 7

| PHASE | CURRENT DIRECTIONS | TERMINAL | | |
|---|---|---|---|---|
| | | 300 | 302 | 304 |
| A | a | H | L | X |
| | | 406=ON | 412=ON | |
| AB | a+b | H | L | L* |
| | | 406=ON | 412=ON | 418=ON |
| B | b | H | X | L |
| | | 406=ON | | 418=ON |
| BC | b+c | H | H* | L |
| | | 406=ON | 410=ON | 418=ON |
| C | c | X | H | L |
| | | | 410=ON | 418=ON |
| CD | c+d | L* | H | L |
| | | 408=ON | 410=ON | 418=ON |
| D | d | L | H | X |
| | | 408=ON | 410=ON | |
| DE | d+e | L | H | H* |
| | | 408=ON | 410=ON | 420=ON |
| E | e | L | X | H |
| | | 408=ON | | 420=ON |
| EF | e+f | L | L* | H |
| | | 408=ON | 412=ON | 420=ON |
| F | f | X | L | H |
| | | | 412=ON | 420=ON |
| FA | f+a | H* | L | H |
| | | 406=ON | 412=ON | 420=ON |

* INDICATES CURRENT SWITCH

FIG. 8

HYBRID COMMUNICATION METHOD AND APPARATUS FOR A THREE-PHASE BRUSHLESS DC MOTOR

BACKGROUND OF THE INVENTION

1. Field of the Invention

This invention relates generally to a method and apparatus for commutating a brushless direct-current (DC) electric motor and more specifically to a method and apparatus for commutating a three-phase brushless DC motor in a disk drive.

2. Description of the Related Art

One of the key components of any computer system is a place to store data. Computer systems have many different places where data can be stored. One common place to store data is on a disk drive. Many times the term disk drive refers to a magnetic or hard disk drive. Herein, the disk drive is meant to have a broader meaning and includes floppy drives, CD-ROM drives and other rotating media. For the purposes of this background, a hard disk drive is recited as an example of all disk drives.

The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in transducing relationship with the disk. The transducer can be used to read information representing data from the disk or write information representing data to the disk. When the disk is operating, the disk is usually spinning at a relatively high RPM. These days common rotational speeds are 5100 and 7200 RPM. At such speeds, the ceramic block flies on a thin layer of gas or air. In some disk drives, the ceramic block is elevated slightly within a layer of lubricant during operation. When not in operation, the ceramic block that carries the transducer rests on the disk. There is usually a designated area on the disk for parking the transducer. The area is selected to minimize static friction or stiction and the torque necessary to overcome the forces associated with stiction necessary to begin the rotation of the disks.

A disk drive includes two motors. One is an actuator motor. A portion of the actuator motor is attached to one end of an actuator arm. On the other end of the actuator arm is the ceramic block carrying the transducer. The actuator motor is used to move and reposition the ceramic block to different locations over the disk where representations of data are to be written or to be read. The other motor is a spindle motor, which is used to rotate the disks.

The disk or disks within a disk drive are attached to a combination hub and spindle. The disk or disks are attached to the hub. During operation of the drive, the disk, hub and spindle are rotated. A spindle motor is attached to the spindle and is used to rotate the disks. Typical spindle motors are three-phase brushless direct-current (DC) motors. Each phase includes a set of coils. Three sets of coils correspond to the three phases. Commutating a spindle motor (or any DC motor) is a procedure for passing current through the coils of the stator to create a shifting magnetic field that acts on the rotor of the motor to move it.

In most instances, the disk is commutated in the bipolar mode during start-up mode and the run mode. Bipolar commutation mode entails passing current through two coils of an electric motor during any drive mode of the motor. The start-up mode of operation is when the disks are accelerated up to an operational velocity. The run mode of operation entails maintaining the operational velocity.

There are problems with bipolar commutation. The energization of each coil of the spindle motor follows a sinusoidal pattern. The torque developed by each phase also follows a sinusoidal pattern. These sinusoidal curves are called torque curves. The torque curves can be plotted for bipolar commutation. The problem is that the torque between successive curves produces a torque that is not constant and actually varies by about 14% of the peak torque value. This causes vibrations that result in acoustic noise. Manufacturers of disk drives try to minimize the amount of such noise that disk drives produce because computers are being used in settings where noise is undesirable. Many manufacturers must achieve minimal noise levels as required by computer system makers.

The variation in torque also results in torque ripple that gives slight variations in speed which must be dampened. In addition, self-induced vibration may cause the transducer attached to the actuator to move off track. Movement off track requires corrections by the servo electronics to prevent read or write errors.

Another problem stems from the trend that disk drives have continually gone down in size. One advancement made over the last two decades was to house the spindle motor within the hub. The space available within the hubs have become smaller and smaller just as the drives have become smaller and smaller. As the disk drives have become smaller, the motors have become smaller and less able to deliver and develop the amount of torque needed to overcome the force of stiction between the ceramic block carrying a transducer and the disk. Sometimes smaller motors cannot develop enough torque to overcome the force of stiction. When a disk drive is stopped, sometimes it can stop or "cog" into a position in relation to the coils where only the minimum torque the motor can develop is available to overcome the force of stiction. With bipolar commutation, this minimum torque is about 14% lower than the peak torque. This minimum is a fundamental barrier to further decreasing the size of the motor. In other words, spindle motors commutated using only a bipolar scheme may not be able to decrease much more in size and still be able to overcome the forces of stiction.

Motors also need to develop high overall torque as quickly as possible to facilitate start-up of the disk drive. During startup, the ceramic block carrying the transducer scrapes across the disk surface until a certain velocity is achieved where the head lifts off from the disk. The faster the certain velocity for lift off occurs the less time the slider scrapes across the surface of the disk. Thus there is always a need for a motor that can deliver a higher overall torque to get the spindle up to speed more quickly. There is also a need to reduce audible acoustic noise generation by vibrations associated with start-up of the disk drive.

SUMMARY OF THE INVENTION

A three winding, Y connected, multiphase-phase brushless DC motor for rotating a disk on a disk drive uses a special commutation procedure to reduce torque ripple to increase the effective torque the motor produces. The motor includes a stator and a rotor. Each winding includes a number of stator poles. Commutation is the process of driving current through the windings to produce a rotating magnetic field that the rotor attempts to catch. A particular method for commutation comprises switching between driving modes where one driving mode drives current through all three winding and another driving mode drives current through two windings of the motor. In this commutation procedure, the driving modes are alternated during one commutation cycle.

Advantageously, this commutation procedure lessens the difference between peak torque and minimum torque produced. The minimum torque produced is 97% of the peak torque. The three percent torque variation lessens cogging. In addition, the average torque constant, which is the "effective" torque constant, is 99% of the peak torque. Thus, more torque is produced for overcoming the forces of stiction between a slider and a disk for most stator positions relative to the rotor. The higher average torque constant also causes the motor to spin up faster so that the slider carrying a transducer "takes off" from the disk surface sooner.

BRIEF DESCRIPTION OF THE DRAWING

FIG. 6 is a table illustrating the tripolar control logic implemented by the spindle motor driver controller of this invention.

FIG. 7 is a table illustrating the bipolar control logic implemented by the spindle motor driver controller of this invention.

FIG. 8 is a table illustrating the bipolar/tripolar logic implemented by this invention.

DESCRIPTION OF THE PREFERRED EMBODIMENT

In the following detailed description of the preferred embodiments, reference is made to the accompanying drawings that form a part hereof, and in which are shown by way of illustration specific embodiments in which the invention may be practiced. It is to be understood that other embodiments may be used and structural changes may be made without departing from the scope of this invention.

Figure 1:
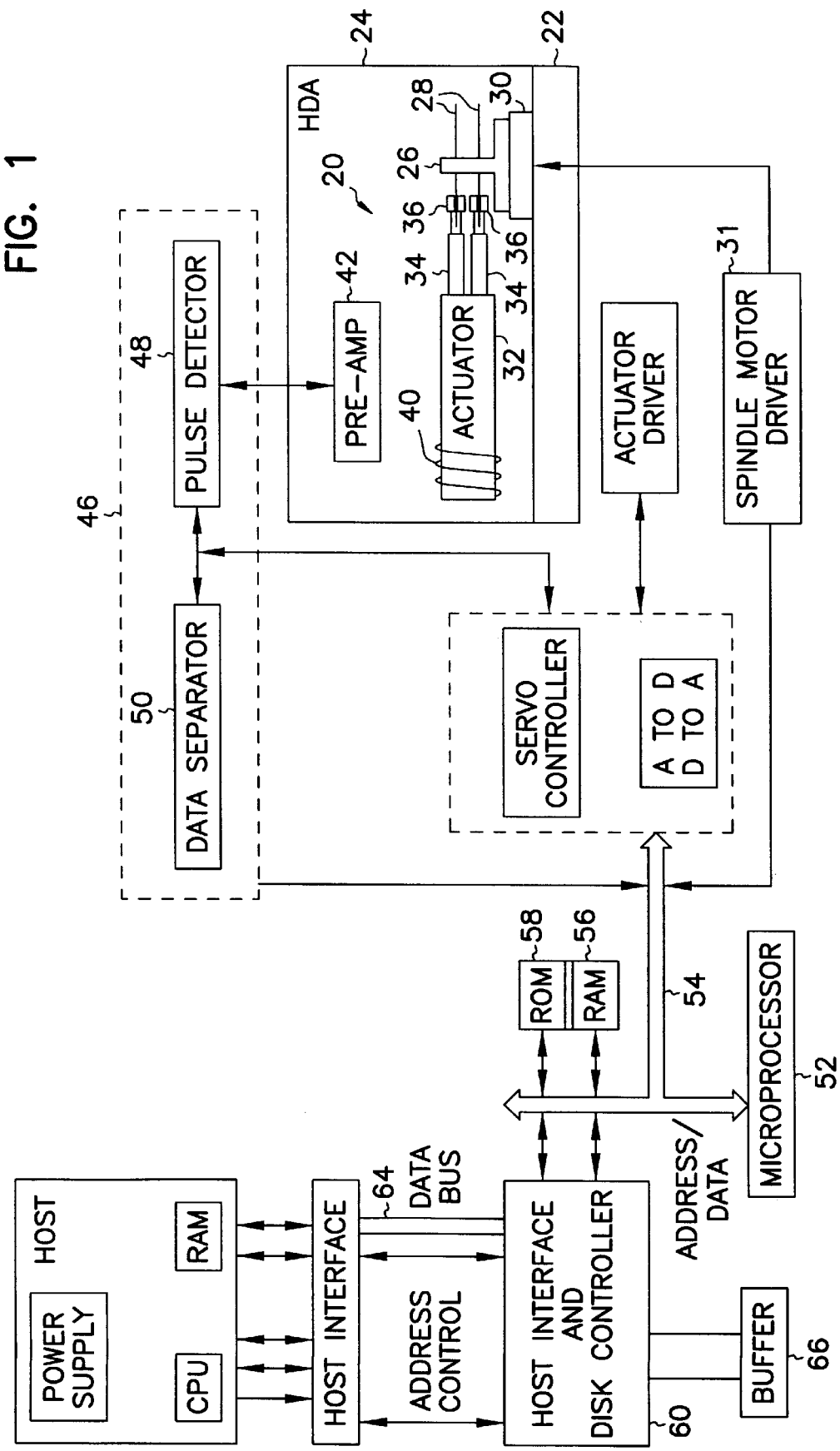
FIG. 1 is a functional block diagram illustrating the functional components of a disk drive system of this invention.

Referring to FIG. 1, the principal electrical and mechanical components of a disk drive constructed in accordance with a preferred embodiment of this invention are illustrated. The disk drive includes a head/disk assembly (HDA) 20, which includes a base 22 and a cover 24. Attached to the base 22 is a spindle with an attached hub 26. Attached to the spindle with an attached hub 26 is a disk 28. Also attached to the base is a spindle motor 30. The spindle motor 30 rotates the spindle with an attached hub 26 and the disk 28 mounted to the hub 26. A spindle motor driver 31 controls the current passing through the spindle motor 30 such that it produces a torque and rotates the hub and disk 28 attached to the spindle. An actuator 32 is also attached to the base 22. The actuator 32 includes arms 34 that carry transducers 36 in transducing relation to the disk. The transducers 36 are actually composed of a slider or small ceramic block and the transducer that is carried by the slider. A portion of an actuator motor 40 is attached to the actuator 32 and positions one or more transducers 36, also known as read/write heads, to different radial positions relative to one or more surfaces of the disk 28.

HDA 20 also includes a read/write preamplifier and head multiplexer circuit 42 for controlling the writing of data to, and the reading of data and servo information from, the surfaces of the disks 28.

A read channel/data separator circuit 46, also known as a data channel, receives analog read data from circuit 42 of HDA 20 and converts it to the data previously written to the disk 28. Read channel data circuit 46 includes a read channel analog filter (not shown) that supplies an analog signal to a pulse detector 48. The output of pulse detector 48 is then supplied to a data separator 50 as raw digital read data.

The disk drive circuit components communicate with a microprocessor 52 through a bus 54 that carries address, control and data information as is well known in the art. The microprocessor 52, within the disk drive, controls access to a random access memory (RAM) 56, which may be internal or external to the microprocessor 52, and a read only memory (ROM) 58, which may also be internal or external to microcontroller 52, as is conventional in the microprocessor art. The microprocessor 52 interfaces with the host through a host-interface disk controller (HIDC) section 60. The disk controller section 60 can be a data sequencer or a microcontroller over which the microprocessor has oversight control. As is well known in the prior art, HIDC section 60 provides control and information to a host computer through a bus and a host interface. HIDC section 60 also provides control and information to the other elements of the disk drive through bus 54. A buffer memory 61 is preferably included with HIDC section 60 to accommodate differences in data flow rates between HIDC section 60 and host computer, and between HIDC section 60 and the elements of the disk drive. The details of the host computer are known to those of skill in the art and is not discussed here.

Figure 2:
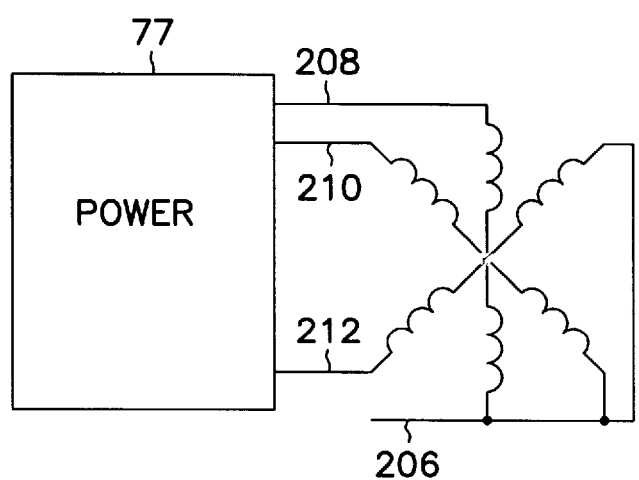
FIG. 2 is a functional diagram of a simple three-phase brushless DC motor.

Now turning to FIG. 2, the basics of a motor is laid out briefly. FIG. 2 shows a simple three-phase induction motor. The spindle motor 30 has a stator 72 and a rotor 73. The stator has three pairs of stator poles 74 and 74', 75 and 75', 76 and 76'. Each of the stator poles has a winding thereon and is connected to a power source. The term three-phase means that during commutation of the motor there are three sinusoidal voltages of equal amplitude and frequency whose successive peaks are separated in time by one-third cycle. In a DC motor, a power source 77 sends a pulse to a first winding and the set of stator poles associated with said first winding, then sends a pulse to a second winding and the set of stator poles associated with said second winding, and then sends a pulse to a third winding and set of stator poles associated with said third winding. The currents in the windings therefore reach their maximum values successively, and the result is a rotating magnetic field in the region between the poles. The rotor follows the magnetic field as it is constantly trying to align itself with the rotating magnetic field. The current within the coils is controlled to make the magnetic field rotate. The pattern used to pass the current through the coils to produce the rotating magnetic field is called commutation.

Figure 3:
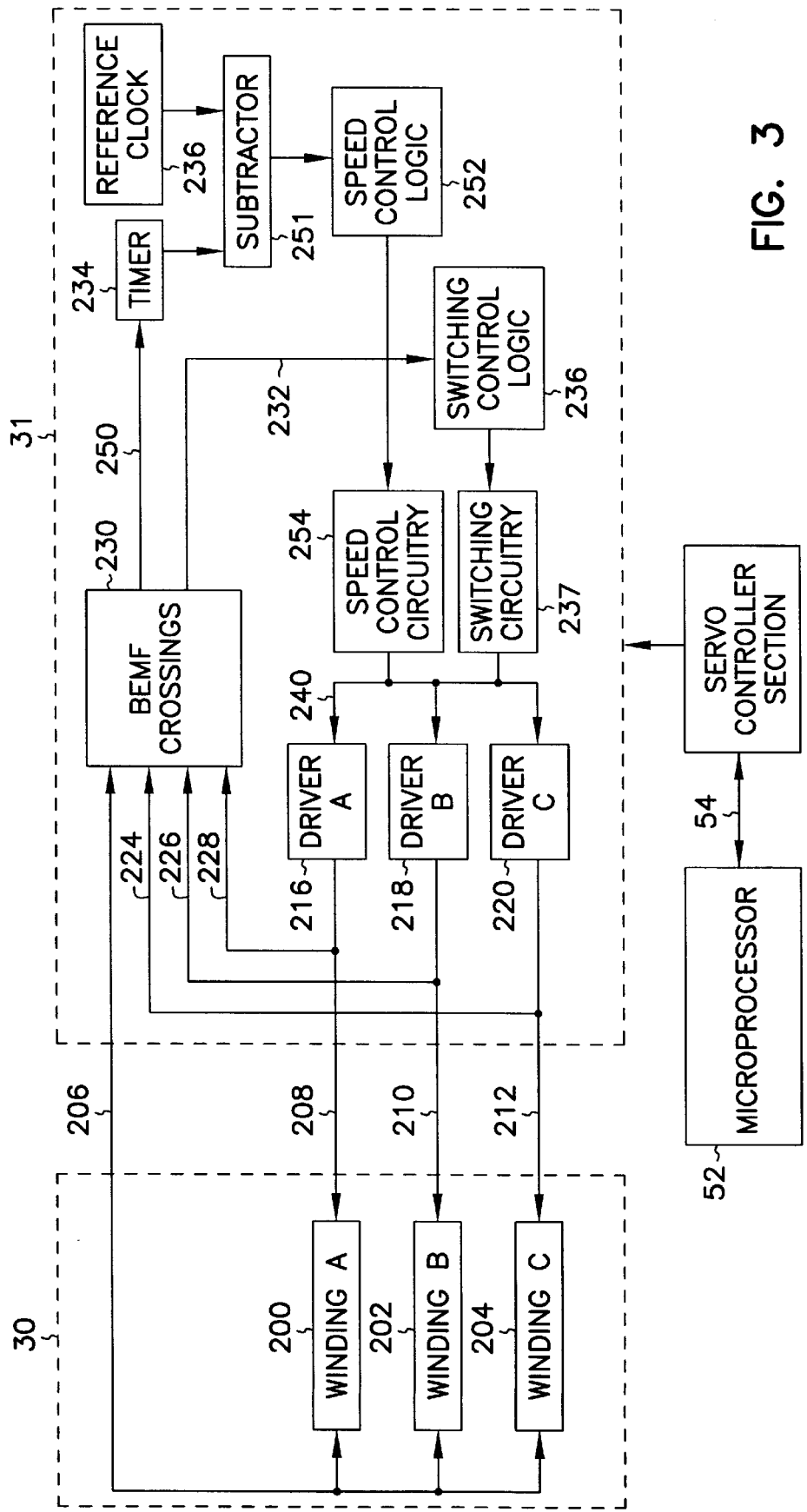
FIG. 3 is a functional block diagram illustrating spindle motor windings and spindle motor driver control modules of the disk drive system of FIG. 1.

Now turning to FIG. 3, the windings of spindle motor 30 and the associated driver and control modules of spindle motor driver 31 are now discussed. As shown in FIG. 3, spindle motor 30 includes windings 200, 202, and 204 each of which has one terminal connected respectively to motor drivers 216, 218, and 220 via signal paths 208, 210, 212. In addition, the other terminals of windings 200, 202, 204 are commonly connected to a motor driver 222 via a signal path 214. Each of motor drivers 216, 218, 220, 222 of spindle motor driver 31 includes a pair of devices, typically field-effect transistors ("FETs"), which provide the necessary drive current to power its respective winding in order to generate the torque needed to rotate the rotor of spindle motor 30.

Spindle motor driver 31 also includes a back electromotive force (BEMF) crossings sense module 230 that is commonly connected to windings 200, 202, 204 via a signal path 206. Sense module 230 monitors the BEMF generated by windings 200, 202, 204 during rotation using one of several conventionally known methods. For example, the sense module measures the voltage amplitude in a winding when the current driver is not driving current through that winding. The spindle motor driver 31 uses the BEMF crossings sense module 230 to control the switching times for the windings 200, 202, and 204; and to control the speed of the motor.

For switching control, the back emf crossing detector 230 outputs a signal at every time the back emf crosses zero for any of the windings 200, 202 or 204. The switching control logic 236 determines the next phase as well as the proper time to switch to the next phase so that the magnetic field produced by the next phase will be just ahead of the rotor. Each phase is a particular combination of windings driven high or low. The phases of the motor go in a sequence. The switching control logic 236 determines the exact time to switch between phases to optimize various operating parameters of the motor.

During start-up mode, the increasing velocity indicates that the rotor is accelerating up to a desired speed. Once the operating speed is achieved, the velocity is held as fixed as possible. The operational mode is when the operational speed is maintained.

Switching circuitry works with the switching control logic module. More particularly, the switching circuitry 237 includes a data register, a subtractor, a comparator and switching logic (all of which are not shown). Crossing detector 230 monitors the BEMF zero-crossings of the windings 200, 202, 204 and generates a pulse for each detected zero-crossing. Timer 234 accumulates the clock pulses until the next BEMF crossing pulse comes and the total number of clock pulses is sent both to the data register and the subtractor. The data register delays its content for one BEMF crossing pulse so that the total number of pulses for the current period is subtracted from the previous period by the subtractor. The difference output of the subtractor is sent to the comparator 236 where the difference is compared with a reference count provided by reference period register 238.

The reference count provided by reference period register is predetermined for each spindle motor to minimize total current drawn during motor spin up. The optimal acceleration (reference count) for switching between various drive modes may be iteratively determined for each disk drive design.

Still referring to FIG. 3, for speed control, when the back emf crosses zero, an output signal is sent over a line 250 to a timer 234. The timer measures the time since the last bemf crossing signal sent over line 254, and outputs a signal representing that value to a subtractor 251. A reference clock 236 also outputs a signal to the subtractor 251. The subtractor 251 subtracts the value output from the timer 234 from the value output from the reference clock 236, or vice versa. The absolute value of the output from the subtractor 251 is input to the speed control logic module 252. The speed control logic module 252 determines the rotational speed of the spindle and determines if a correction is needed. The speed control logic module 252 also can determine if the rotor is accelerating or decelerating or maintaining the same rotational velocity by looking at one or more previously calculated rotational velocities. The speed control logic then controls the speed control circuitry 254 which controls the current in the windings to either speed up, slow down or maintain the rotational speed of the spindle. It should be noted, that for speed control, every time there is a back emf crossing there does not have to be an output sent to the timer 234. There are multiple back emf crossings during one revolution of the spindle. Speed control can be accomplished if done once a revolution rather than multiple times during a revolution of the spindle. Therefore a signal can be sent over line 254 after a number of back emf crossings have been detected. Furthermore, it should be noted that signals other than the back emf crossing signal can be used for speed control. For example, disks have servo markings that produce a signal indicative of rotational position.

The output timer module 234, the reference clock 236, the subtractor 251 and the speed control logic 252 form a feedback control system for the spindle motor 30. The speed control logic 252 compares the measured velocity to the desired velocity and uses the information to control the drivers 216, 218, and 220 to enable the rotor to spin at the target velocity.

Figure 4:
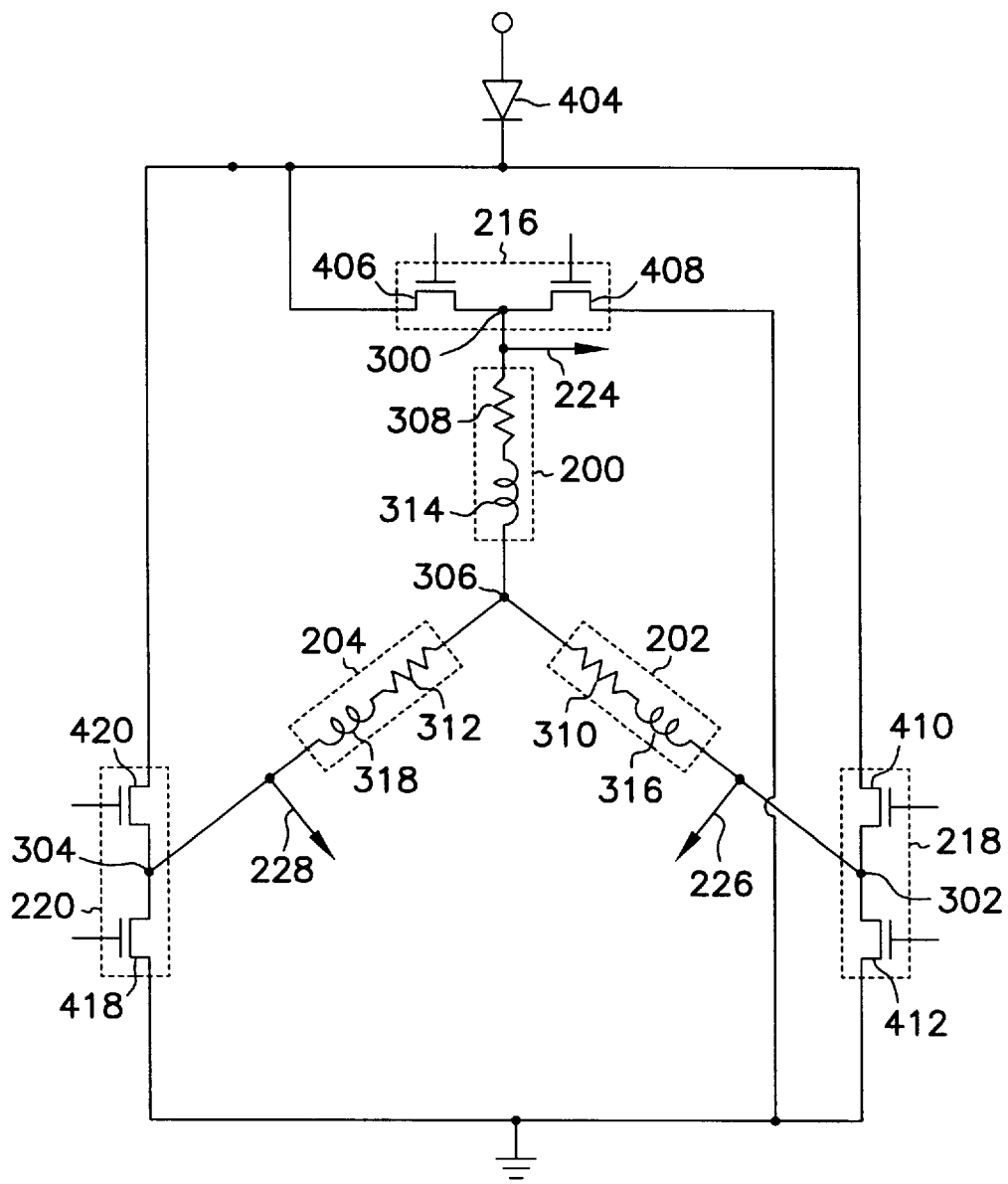
FIG. 4 is a schematic diagram illustrating the spindle motor windings and spindle motor drivers of this invention.

Referring now to FIG. 4, the connections between motor drivers 216, 218, 220 and windings 200, 202, 204, along with their operations, are shown. Each of motor drivers 216, 218, 220 consists of a pair of switches comprising field-effect transistors (FETs) 406, 408, 410, 412, 418 and 420, which are connected in series, with the source of one FET connect to the drain of the other FET. The unconnected source of each pair of FETs is connected to a positive voltage while the unconnected drain is connected to ground. Terminals 300, 302, 304 of windings 200, 202, 204 are connected to their respective motor drivers 216, 218, 220 at a point between the series connected source and drain of each pair of FETs.

Also shown in FIG. 4 are schematic diagrams of windings 200, 202, 204 of spindle motor 30. Each of windings 200, 202, 204 consists of a number of turns of wire having a corresponding resistance 308, 310, 312 and inductance 314, 316, 318. Resistances 308, 310, 312 determine the amount of direct current that flows through their respective winding, while inductances 314, 316, 318 generate the BEMF that is monitored by sense module 230. The BEMF generated voltages are monitored at points 224, 226, 228 and 306 shown in FIG. 5.

As mentioned above, the torque produced by spindle motor 30 is proportional to the amount of current driving the windings 200, 202, 204. However, the torque produced by each winding at every rotational angle is not a constant, but instead varies according to the rotational position of the winding. Stated differently, the torque at every rotational angle varies according to the position of the winding stators relative to the permanent magnets.

The total torque produced does not change linearly with the number of windings being driven, but also depends on vectorial combination of torque generated by each winding. Bipolar and tripolar driving modes have different amounts of total generated torque. For example, when spindle motor 30 is driven in the tripolar mode it requires approximately 33 percent more current than the bipolar mode, but produces only about 16 percent more torque.

Figure 5:
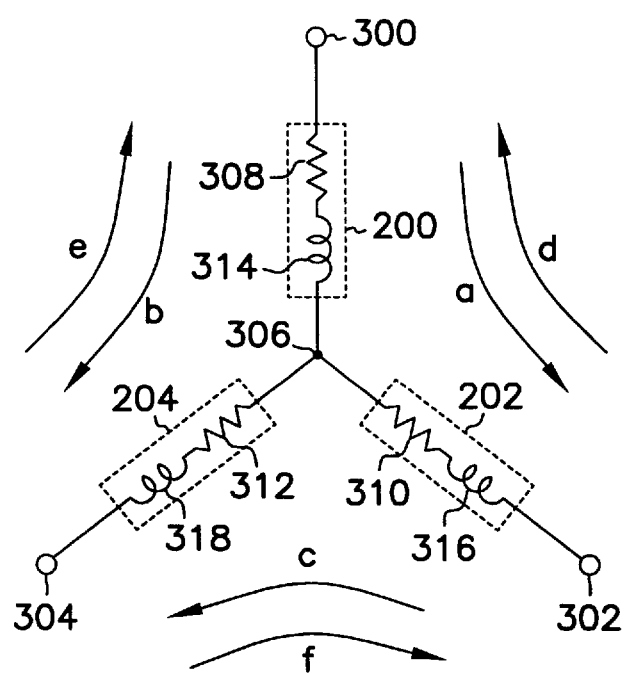
FIG. 5 is a schematic diagram illustrating the directions of current flow in the spindle motor windings when using tripolar or bipolar driving modes.

In FIG. 5 the six directions (e.g. a–f) in which the current may flow through windings 200, 202, 204 when driving in the bipolar drive mode or tripolar drive mode are shown. When driving spindle motor 30 using the tripolar drive mode, two of the six current directions are simultaneously driven resulting in all three of windings 200, 202, 204 being powered. The two current directions take place in a particular sequence. However, when driving spindle motor 30 using the bipolar drive mode, only one current direction is driven at a time resulting in two of the three windings 200, 202, 204 being simultaneously powered. As discussed in more detail later, the directions of current flow are switched by motor drivers 216, 218, 220 under the control of comparator/control logic module 236.

FIG. 6 is a table illustrating the functional logic applied to terminals 300, 302 and 304 for generating the six operating phases AB through FA during tripolar driving modes. Note that each operating phase results from current flowing through all three of windings 200, 202, 204. Thus, for tripolar mode all three windings are simultaneously driven such that, at any time, two terminals have one polarity and the other terminal has the opposite polarity. Note also that changing from one phase to the next only requires switching one terminal from high to low or low to high.

Continuing with FIG. 7, a table that similarly illustrates the functional logic applied to terminals 300, 302, 304 for generating the six operating phases A through F during bipolar driving is provided. For bipolar driving two of windings 200, 202 and 204 are simultaneously driven with the third winding not driven (e.g. both FETs for the corresponding driver are turned off). As with tripolar driving, phase changes can be made by switching only one of terminals 300, 302 and 304 at a time.

Now referring to FIG. 8, a table that illustrates the functional logic applied to terminals 300, 302, 304 for generating 12 operating phases during the bipolar/tripolar driving mode or method is provided. During the bipolar driving modes, which are denoted by single letters in the phase column, two of the windings 200, 202 and 204 are simultaneously driven while the third winding is not driven (e.g., both FETs for the corresponding driver are turned off). Six of the operating phases, designated AB through FA, are due to tripolar drive modes. During the tripolar drive modes, each operating phase results from current flowing through all three of the windings 200, 202, 204. In other words, for tripolar drive modes, all three windings are simultaneously driven such that, at any time, two terminals have a high voltage state or a low voltage state and the other remaining terminal has the opposite voltage state of the other two terminals. In looking at the table in FIG. 8, the 12 operating phases include alternating bipolar and tripolar drive modes. That is, the tripolar drive modes are interleaved within the bipolar drive modes.

Figure 11:
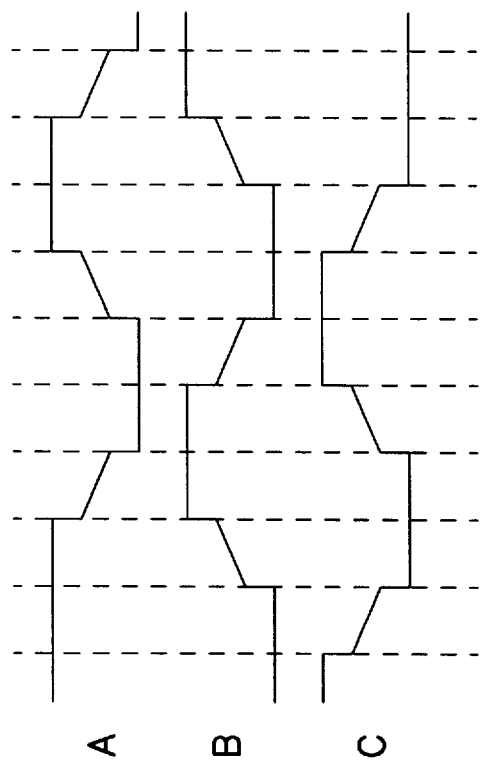
FIG. 11 is a diagram illustrating the voltage waveforms of windings A, B, and C associated with the spindle motor windings when using the bipolar driving mode.

FIG. 11 is a diagram illustrating the voltage waveforms of windings A, B, and C associated with the spindle motor windings when using the bipolar driving mode. The voltages are either high or low. FIG. 11 is related to FIG. 7 which shows the six phases found in one commutation cycle of a motor driven in the bipolar mode. The phases in FIG. 11 are separated by vertical lines. The bipolar drive mode includes six phases per revolution of the rotor. The voltages for winding A correspond to the voltages at terminal 300 in FIG. 7. At the left hand side of FIG. 11, the voltage for winding A is high during the first phase (Phase A for terminal 300 in FIG. 7); high again during the second phase (Phase B for terminal 300 in FIG. 7); the voltage drops and is sloped during the third phase (Phase C for terminal 300 in FIG. 7) which indicates the voltage due to back emf of winding A during the undriven state; the voltage is low during the fourth phase (Phase D for terminal 300 in FIG. 7); the voltage is low again during the fifth phase (Phase E for terminal 300 in FIG. 7); and the voltage increases at a sloped value during the sixth phase (Phase F for terminal 300 in FIG. 7) which indicates the voltage associated with the back emf of winding A during the undriven state. Winding B of FIG. 11 corresponds to the voltages at terminal 302 in FIG. 7. Winding C of FIG. 11 corresponds to the voltages at terminal 304 in FIG. 7. The voltages at the winding B and winding C correspond to the voltages at the above terminals indicated. The description for winding B and winding C would merely report the voltages as high or low or undriven (indicated by an "X" in one of the columns) for the two columns labeled 302 and 304 in FIG. 7, respectively.

Figure 12:
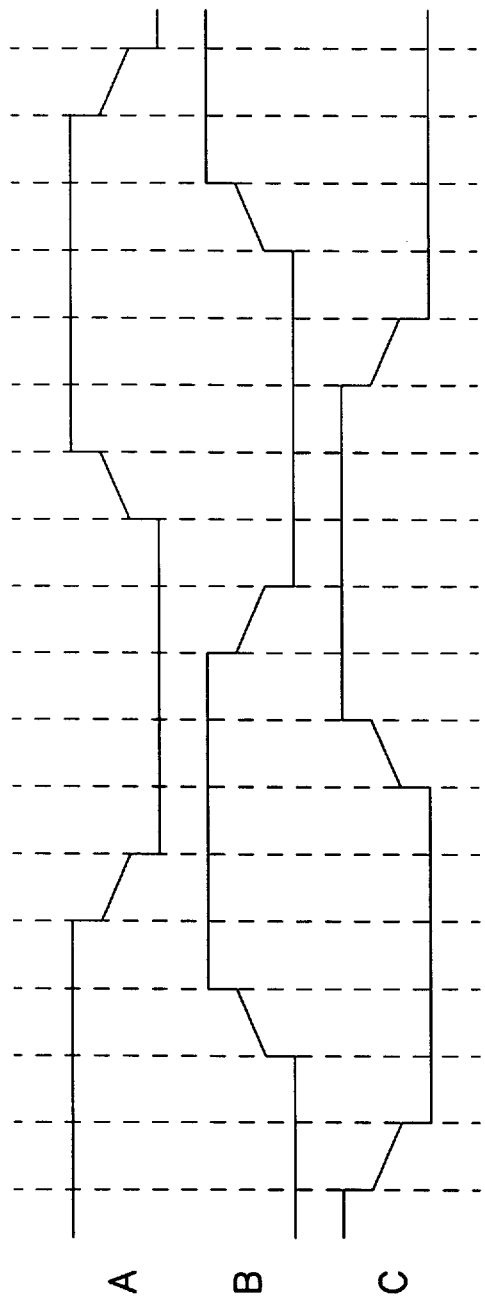
FIG. 12 is a diagram illustrating the voltage waveforms of windings A, B, and C associated with the spindle motor windings when using the tripolar and bipolar driving mode.

FIG. 12 is a diagram illustrating the voltage waveforms of windings A, B, and C associated with the spindle motor windings when using the tripolar and bipolar driving mode. The voltages are either high or low. FIG. 12 is related to FIG. 8 which shows the twelve phases found in one commutation cycle of a motor driven in the combination bipolar and tripolar mode. The phases in FIG. 12 are separated by vertical lines. The combination bipolar and tripolar drive mode includes twelve phases per electrical cycle. In other words, the combination bipolar and tripolar mode has twice as many phases for each commutation cycle when compared to the bipolar drive mode. The voltages for winding A correspond to the voltages at terminal 300 in FIG. 8. At the left hand side of FIG. 12, the voltage for winding A is high during the first, second, third and fourth phases (Phases A, AB, B and BC for terminal 300 in FIG. 8); the voltage drops and is sloped during the fifth phase (Phase C for terminal 300 in FIG. 8) which indicates the voltage due to back emf of winding A during the undriven state; the voltage is low during the fourth phase (Phase D for terminal 300 in FIG. 7); the voltage is low again during the sixth, seventh, eighth, ninth and tenth phases (Phases CD, D, ED, E, and EF for terminal 300 in FIG. 8); the voltage increases at a sloped value during the eleventh phase (Phase F for terminal 300 in FIG. 7) which indicates the voltage associated with the back emf of winding A during the undriven state; and high again during the twelfth phase (Phase FA for terminal 300 in FIG. 8). Winding B of FIG. 12 corresponds to the voltages at terminal 302 in FIG. 8. Winding C of FIG. 12 corresponds to the voltages at terminal 304 in FIG. 8. The description for winding B and winding C would merely report the voltages as high or low or undriven (indicated by an "X" in one of the columns) for the two columns labeled 302 and 304 in FIG. 8, respectively.

Figure 9:
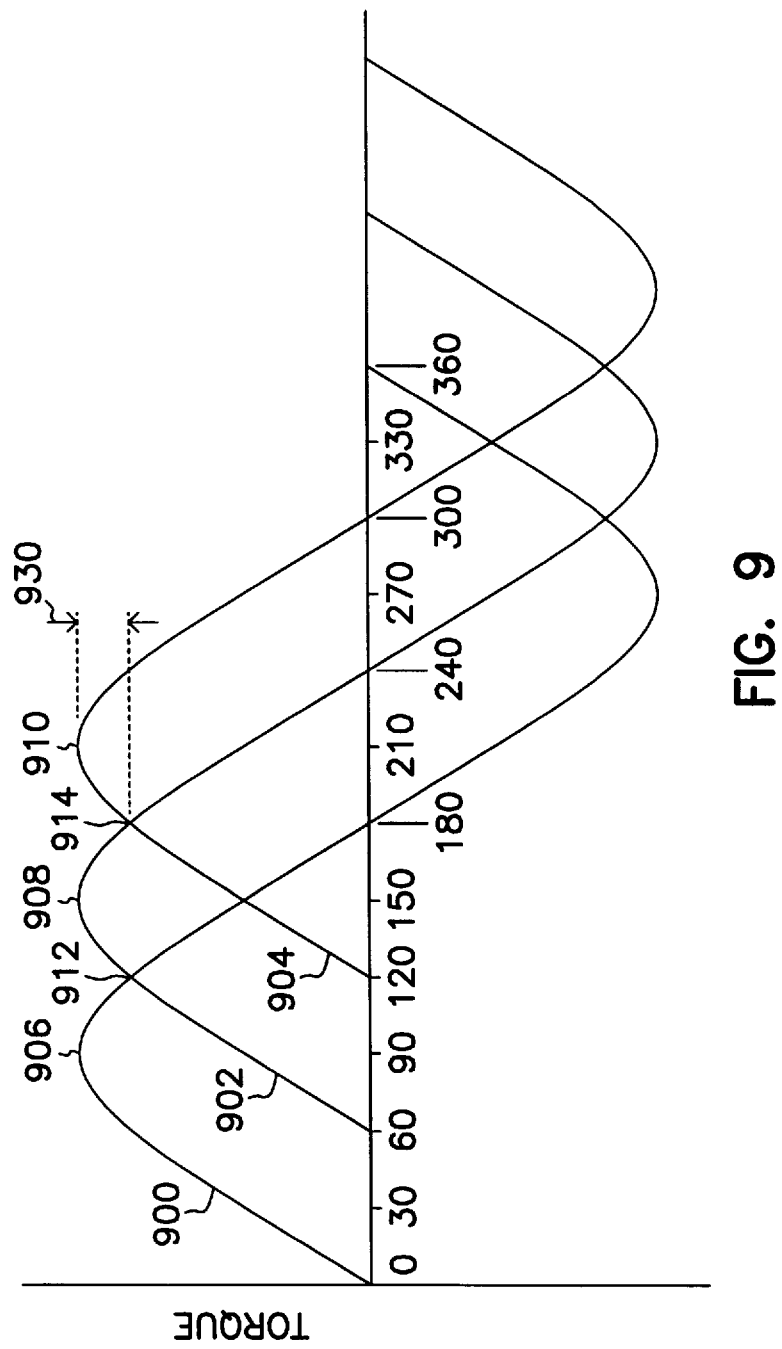
FIG. 9 is a diagram illustrating the torque curves associated with the spindle motor windings when using the bipolar driving mode.

As mentioned above, the chief advantage associated with this particular commutation where tripolar phases are interleaved with bipolar phases or vice versa, is that the torque ripple is reduced significantly, and the total torque output is raised considerably for the spindle motor 30. A comparison of FIGS. 9 and 10 reveals the advantages of the bipolar/tripolar commutation with respect to a purely bipolar commutation. The curves in FIG. 9 show the torque developed by each of the windings. Each of the curves is sinusoidal. The torque is shown on the Y axis while the various positions around the motor are shown on the X axis. A motor rotates through 360°, so only 360° are shown for purposes of this figure. In FIG. 9, a bipolar driving state occurs every 60°, so the torque that is developed also has peaks that occur 60° from one another. The valley or negative peaks also occur 60° apart from one another. FIG. 9 shows three torque curves for bipolar commutation. The first torque curve 900 starts at zero and has a first peak at 90°, again crosses the zero at 180° and has another negative peak at 270° and crosses zero once again at 360°. The second curve 902 starts at a zero torque value at 60°, has a first peak at 150°, crosses zero again at 240°, has a negative torque peak at 330° and then crosses zero again at 60° or 420°, which are the same in terms of the position of the rotor with respect to the stator. This can be seen. Each of the torque curves is offset from another torque curve by 60° when using a bipolar commutation. The peaks, labeled 906, 908 and 910 are also 60° displaced from one another. There are also troughs between successive torque curves as denoted by reference number 912 and reference number 914. Torque ripple is the difference in torque that occurs between a peak, such as 908 or 910 and the trough beside the peak, such as trough 914. The torque ripple has a definite value and is shown as a torque variation 930 in FIG. 9. In a bipolar drive state, the generated torque varies between its peak value and around 83% of the peak value, which occurs at the troughs 912, 914. Although there are actually more than three torque curves for a motor, only three torque curves are included for the purposes of illustration in FIG. 9.

Figure 10:
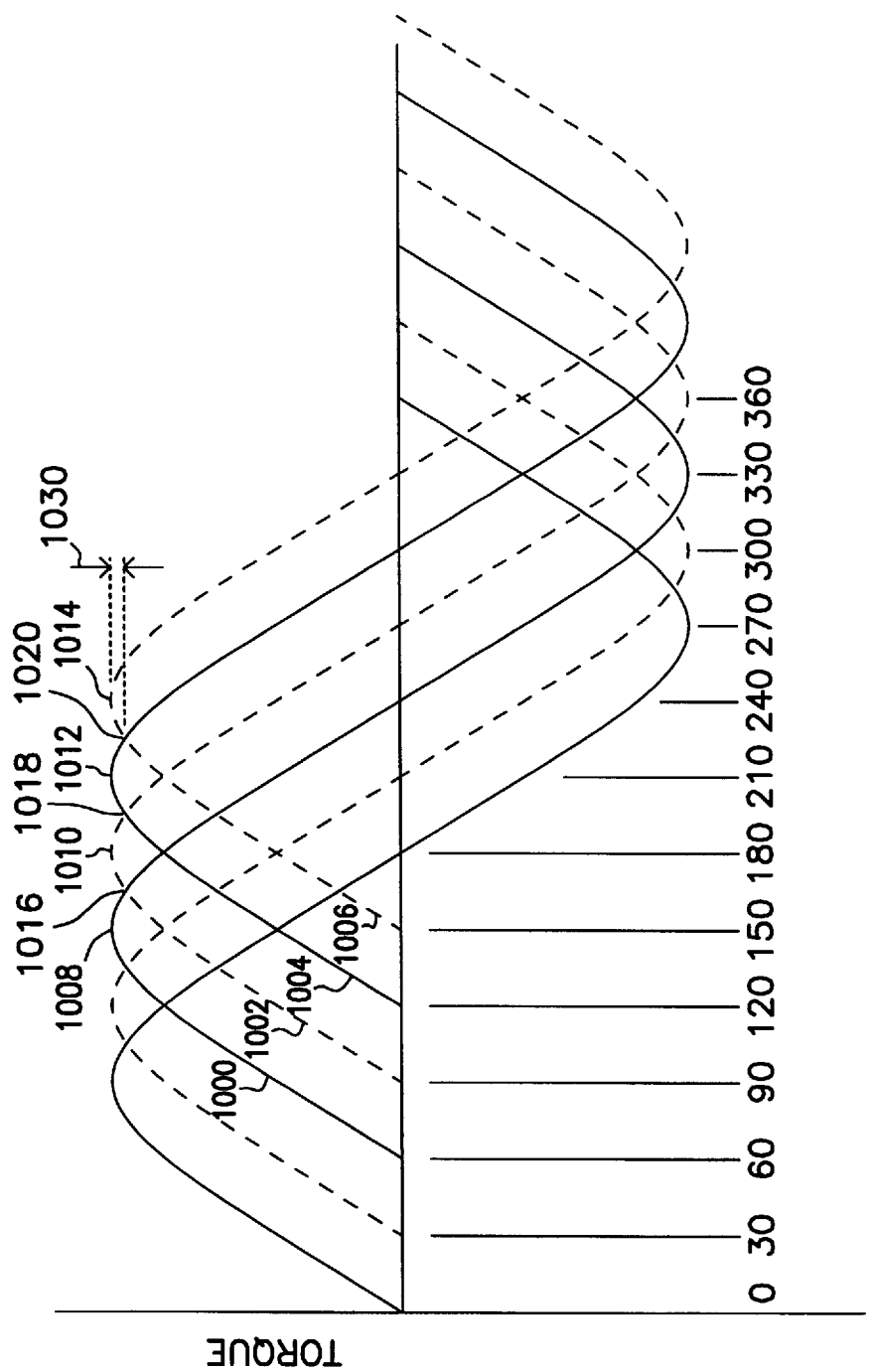
FIG. 10 is a diagram illustrating the torque curves associated with the spindle motor windings when using the tripolar and bipolar driving mode.

Now looking at FIG. 10, the torque curves for the bipolar/tripolar commutation are now discussed. Like FIG. 9, FIG. 10 shows the torque on the Y axis and the position of the rotor with respect to the stator on the X axis. The torque curves for the bipolar/tripolar commutation occur 30° apart from one another. For purposes of this figure, six torque curves are shown. Although a distinct torque curve is generated at every 30° increment, only four of these torque curves are now discussed for illustrative purposes. These torque curves are 1000, 1002, 1004, and 1006. Torque curve 1000 has a zero crossing at 60° and it has a peak 1008 occurring at 150°, crosses zero at 240°, has a negative peak at 330° and reaches zero again at 420° or 60° (these are the same). Torque curve 1002 is shifted by approximately 30°. The peaks of the torque curve 1002 as well as the zero crossing points also are shifted 30°. Torque curve 1002 is dashed, which indicates that it is one of the tripolar drive modes. The solid lines are part of the bipolar drive modes and track the torque curve shown in FIG. 9. The advantage of having the bipolar/tripolar commutation is that the torque curve from the tripolar drive state has a peak, such as 1010, that occurs right in the trough between the tripolar drive modes. This shifts the trough slightly and, more importantly, makes the torque variation or torque ripple much smaller. The torque variation occurs between a trough, such as 1020, and a peak 1012 and 1014. The torque variation is shown as value 1030 in FIG. 10. The trough occurs at approximately 97% of the peak value of the torque. In other words, point 1020 is approximately 97% of the torque that is associated with the point 1014. Thus, the torque ripple is considerably reduced. The torque generated as a function of rotor position varies between 100% of peak torque and 97% of peak torque. This is a reduction in torque ripple of approximately 4 to 1 when compared to commutating the motor using only the bipolar drive mode.

In addition, the average torque along the positive values of the various torque curves is approximately 99% of the torque's peak value as compared to the strictly bipolar commutation drive modes shown in FIG. 9 where the average torque constant is about 96% of the peak torque constant of the motor. The advantage thus becomes readily apparent when looking at these two figures, FIGS. 9 and 10. The motor cogging due to torque ripple is substantially reduced and the effective torque is increased.

This becomes very important in several situations. For example, when the read/write transducing head or slider is first started, the forces of stiction must be overcome. The minimum torque produced by the tripolar/bipolar commutation, as represented by the trough points, such as 1018 and 1020, occur where there is a higher torque. In other words, in overcoming stiction, the available torque is higher even when the motor stops in a resting position at one of the trough points. Another important advantage of having a motor with a higher effective torque is that the disk can now spin up faster. It is critical in the life of disk drives that the slider or transducing element lift off from the disk as soon as possible. With a higher effective torque, the take off velocity is more quickly achieved, which results in longer disk drive operating life. Additionally, spinup time is an important part of disk drive specifications.

Additional Advantages of the Tripolar/Bipolar Drive Mode

In addition to increasing minimum torque generation, the torque variation during a commutation cycle is reduced. The vibration associated with the spindle motor commutation is reduced with the tripolar/bipolar driving modes. There is also less acoustic noise. Many computer companies specify maximum acoustic noise levels, so the drop in acoustic noise level helps disk drive manufacturers to stay within the specified noise levels. Power dissipation drops and the average back emf constant (volts per kilorevolution) is increased.

It is to be understood that the above description is intended to be illustrative, and not restrictive. Many other embodiments may be apparent to those of skill in the art upon reviewing the above description. Accordingly, the scope of the invention should be determined with reference to the appended claims, along with the full scope of equivalents to which such claims are entitled.

We claim:

1. A method of controlling switching elements to commutate a DC inductive motor having a rotor and a stator, the motor including at least three windings, each winding having a terminal connected to a switching element, each switching element having a driven state and an undriven state, the motor being characterized by generating torque on the rotor with the amount of the generated torque depending upon current direction and upon angular position of the rotor relative to the stator in accordance with a set of torque curves, the method comprising the steps of:

a. causing one of the switching elements to be in the undriven state and the remaining switching elements to be in the driven state to cause current to flow through at least two of the windings during a first driving mode of a commutation cycle, the commutation cycle having the first driving mode and a second driving mode for sequentially defining a plurality of phases, the number of phases being quadruple the number of windings, the motor generating torque in accordance with a sequence of the torque curves during the commutation cycle, the commutation cycle including switching into and temporarily remaining in the first driving mode, and while temporarily remaining in the first driving mode, the torque generated is determined by a first torque curve;

b. monitoring zero crossings of back emf voltage in the winding connected to the switching element having the undriven state;

c. causing all the switching elements to be in the driven state to cause current to flow through all of the windings during the second driving mode of the commutation cycle, the commutation cycle including switching into and temporarily remaining in the second driving mode, and while temporarily remaining in the second driving mode, the torque generated being determined by a second torque curve, the time for switching between the first driving mode of step a and the second driving mode of step c being determined from the zero crossings of back emf voltage monitored in step b;

d. repeating steps a through c during each commutation cycle, the time for switching between the second driving mode of step c and the first driving mode of step a being determined from the zero crossings of back emf voltage monitored in step b, and the sequence of torque curves generated during each commutation cycle having a torque ripple that is less when switching between the first driving mode and the second driving mode than when switching between the same driving modes.

2. A disk drive comprising:

a base;

a spindle having a hub;

a spindle motor coupled to the base for rotating the spindle motor and the disk, the spindle motor having a rotor and a stator, the spindle motor including at least three windings, the spindle motor being characterized by generating torque on the rotor with the amount of the generated torque depending upon current direction and upon angular position of the rotor relative to the stator in accordance with a set of torque curves;

switching elements connected to the windings, each switching element having a driven state and an undriven state;

means for causing one of the switching elements to be in the undriven state and the remaining switching elements to be in the driven state to cause current to flow through at least two of the windings during a first driving mode of a commutation cycle, the commutation cycle having the first driving mode and a second driving mode for sequentially defining a plurality of phases, the number of phases being quadruple the number of windings, the motor generating torque in accordance with a sequence of the torque curves during the commutation cycle, the commutation cycle including switching into and temporarily remaining in the first driving mode, and while temporarily remaining in the first driving mode, the torque generated is determined by a first torque curve;

means for monitoring zero crossings of back emf voltage in the winding connected to the switching element having the undriven state;

means for causing all the switching elements to be in the driven state to cause current to flow through all of the windings during the second driving mode of the commutation cycle, the commutation cycle including switching into and temporarily remaining in the second driving mode, and while temporarily remaining in the second driving mode, the torque generated is determined by a second torque curve, the time for switching between the first driving mode and the second driving mode being determined from the zero crossings of back emf voltage monitored in the winding connected to the switching element having the undriven state;

means for switching between the second driving mode and the first driving mode, the time for switching between the second driving mode and the first driving mode being determined from the zero crossings of back emf voltage monitored in the winding connected to the switching element having the undriven state, and the sequence of torque curves generated during each commutation cycle having a torque ripple that is less when switching between the first driving mode and the second driving mode than when switching between the same driving modes.

* * * * *